United States Patent
Andrle et al.

(10) Patent No.: US 10,528,189 B2
(45) Date of Patent: Jan. 7, 2020

(54) EVALUATION OF TOUCH SCREEN DISPLAY CAPACITANCE USING A TOUCH SCREEN CONTROLLER

(71) Applicant: STMicroelectronics Design and Application S.R.O., Prague (CZ)

(72) Inventors: Milan Andrle, Prague (CZ); Martin Havlasek, Prague (CZ); Martin Fucik, Prague (CZ)

(73) Assignee: STMicroelectronics Design and Application S.R.O., Prague (CZ)

( * ) Notice: Subject to any disclaimer, the term of this patent is extended or adjusted under 35 U.S.C. 154(b) by 0 days.

(21) Appl. No.: 15/948,147

(22) Filed: Apr. 9, 2018

(65) Prior Publication Data
US 2019/0310736 A1   Oct. 10, 2019

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 3/0414* (2013.01); *G06F 2203/04104* (2013.01)

(58) Field of Classification Search
CPC ....... G06F 3/0414; G06F 3/0418; G06F 3/044
See application file for complete search history.

(56) References Cited

U.S. PATENT DOCUMENTS

| | | | |
|---|---|---|---|
| 2012/0092350 A1* | 4/2012 | Ganapathi | G02B 26/0833 345/501 |
| 2014/0232691 A1* | 8/2014 | Lee | G06F 3/044 345/174 |
| 2015/0261340 A1* | 9/2015 | Krah | G06F 3/044 345/174 |
| 2018/0039809 A1* | 2/2018 | Chung | G06K 9/0002 |

* cited by examiner

*Primary Examiner* — Kevin M Nguyen
(74) *Attorney, Agent, or Firm* — Crowe & Dunlevy (57) ABSTRACT

Disclosed is a method for testing touch screen displays during manufacture. A touch screen controller (TSC) is packaged, and the analog channels of the TSC are characterized, with resulting data being stored for later use. The TSC is programmed, and the touch screen display and TSC are packaged together. The touch screen display is tested using firmware in the TSC, enabling calculation of the inherent capacitances between force and sense lines of the touch screen display when connected to the TSC during operation. The testing involves, for each force and sense line pair, measuring an output signal generated by a receive channel of the TSC coupled to the sense line of that pair. Based upon the data gathered during characterization, and the signals measured during testing, the capacity of the touch screen display is then calculated.

23 Claims, 9 Drawing Sheets

EVALUATION OF TOUCH SCREEN DISPLAY CAPACITANCE USING A TOUCH SCREEN CONTROLLER

TECHNICAL FIELD

This disclosure is directed to the field of touch screen display manufacture, and, in particular, to methods and techniques for determining the inherent capacitances between force lines and sense lines of a touch screen display, without the use of external test equipment.

BACKGROUND

A touch screen display is a device that can detect an object in contact with or in proximity to a display area. The display area can be covered with a touch-sensitive matrix that can detect a user's touch by way of a finger or stylus, for example. Touch screen displays are used in various applications such as mobile phones, tablets, smartwatches, and other mobile devices. A touch screen display may enable various types of user input, such as touch selection of items on the screen or alphanumeric input via a displayed virtual keypad. Touch screen displays can measure various parameters of the user's touch, such as the location, duration, etc.

One type of touch screen display is a capacitive touch screen display. A capacitive touch screen display may include a capacitive touch matrix of conductive rows and conductive columns overlaid on the display area. The rows and columns are spaced apart from one another so as to not make contact. The capacitive touch screen display may be used for mutual capacitance sensing.

In mutual capacitance sensing, the capacitance between each row and column of the capacitive touch matrix may be sensed. A change in the sensed capacitance between a row and a column may indicate that an object, such as a finger, is touching the screen or is in proximity to the screen near the region of intersection of the row and column. Mutual capacitance sensing circuits employ a "forcing" signal applied to a column of the capacitive touch matrix and sensing of the coupled signal on respective rows (or vice-versa).

When a touch screen controller that provides the forcing signal and that senses the ensuing coupled signal is coupled to the columns and rows, there is a certain inherent capacitance between respective column and row pairs of the touch screen display. Determination of these capacitances is useful for verifying quality of capacitive touch screen displays as they are manufactured. Currently, such determination is performed using external test equipment. However, this can be burdensome and time consuming. Therefore, further advances in determination of these capacitances are desirable.

SUMMARY

Disclosed herein is a method including providing a touch screen controller having transmit and receive channels, determining at least one subcomponent characteristic and at least one operational parameter of at least one transmit channel from among the transmit channels of the touch screen controller, and coupling a touch screen display having force lines and sense lines to the transmit and receive channels of the touch screen controller. The method continues with applying a force signal from the at least one transmit channel to a corresponding force line of the touch screen display, using the touch screen controller, receiving a touch signal from a sense line of the touch screen display corresponding to the force line, at the touch screen controller, and processing the touch signal so as to generate a touch data signal, using the touch screen controller. The method proceeds to determine an inherent capacitance between the force line and the sense line as a function of the touch data signal, a common mode voltage between the force line and the sense line, the at least one subcomponent characteristic, and the at least one operational parameter, using the touch screen controller. The inherent capacitance is a capacitance between the force line and the sense line that is independent of the touch screen controller.

The touch signal may represent a capacitance between the force line and the sense line. Processing of the touch signal using the touch screen controller may include compensating the capacitance by coupling a compensation circuit to the force line a given number of times, converting the charge (which basically represents the measured capacitance) to a current, using a current to current converter (current conveyor), accumulating the resulting charge a given number of times to produce an accumulated voltage signal, using an accumulator circuit, and amplifying the accumulated signal to produce the touch data signal, using a gain stage.

The at least one operational parameter may be at least one of a number of accumulations performed by the accumulator circuit and a number of times the compensation circuit is coupled to the force line.

The at least one subcomponent characteristic may be at least one of a capacitance of a feedback capacitor in the accumulator circuit and capacitance values of capacitors in the compensation circuit.

The inherent capacitance may be determined as a function of a sum of first and second expressions. The first expression may include a product of the touch data signal and the capacitance of the feedback capacitor, divided by at least the number of accumulations performed by the accumulator circuit. The second expression may include a product of the common mode voltage, the number of times the compensation circuit is coupled to the force line, and a sum of the capacitance values of capacitors in the compensation circuit.

The at least one subcomponent characteristic and the at least one operational parameter is to be stored in a non-volatile memory of every particular touch screen controller device.

Providing the touch screen display may be manufacturing the touch screen display.

Also described herein is a system including a touch screen display having force lines and sense lines, and a touch screen controller having transmit and receive channels respectively force and sense lines of the touch screen display. The touch screen controller is configured to apply a force signal from at least one transmit channel to a corresponding force line of the touch screen display, receive a touch signal from a sense line corresponding to the force line, process the touch signal so as to generate a touch data signal, and determine an inherent capacitance between the force line and the sense line as a function of the touch data signal, a common mode voltage between the force line and the sense line, at least one subcomponent characteristic of the touch screen controller, and at least one operational parameter of the touch screen controller. The inherent capacitance may be a capacitance between the force line and the sense line that is independent of the touch screen controller.

The touch screen controller includes a non-volatile memory storing the at least one subcomponent characteristic and the at least one operational parameter.

The touch signal may represent a capacitance between the force line and the sense line, and the touch screen controller may include a compensation circuit having a capacitor configured to be selectively coupled to the force line a given number of times, a capacitance to current converter configured to convert the capacitance to a current, an accumulator circuit including a feedback capacitor and configured to accumulate the charge a given number of times to produce an accumulated signal, and a gain stage configured to amplify the accumulated signal to produce the touch data signal.

The at least one operational parameter may include at least one of a number of accumulations performed by the accumulator circuit, and a number of times the compensation circuit is coupled to the force line.

The at least one subcomponent characteristic may include at least one of a capacitance of the feedback capacitor in the accumulator circuit and a capacitance value of the capacitor in the compensation circuit.

The touch screen controller may determine the inherent capacitance as a function of a sum of first and second expressions, with the first expression including a product of the touch data signal and the capacitance of the feedback capacitor, divided by at least the number of accumulations performed by the accumulator circuit, and with the second expression including a product of the common mode voltage, the number of times the compensation circuit is coupled to the force line, and a sum of the capacitance values of capacitors in the compensation circuit.

The method described herein covers manufacturing a plurality of touch screen controllers having transmit channels and receive channels. For each of the plurality of touch screen controllers, the method includes characterizing that touch screen controller so as to determine at least one subcomponent characteristic and at least one operational parameter of at least one transmit channel of that touch screen controller, storing the at least one subcomponent characteristic and the at least one operational parameter in a non-volatile memory of that touch screen controller, programming that touch screen controller to, in a touch screen display characterization mode, apply a force signal from at least one transmit channel to a corresponding force line of a touch screen display, receive a touch signal from a sense line corresponding to the force line, process the touch signal so as to generate a touch data signal, and determine an inherent capacitance between the force line and a corresponding touch line of the touch screen display as a function of the touch data signal, the at least one subcomponent characteristic of the touch screen controller, and the at least one operational parameter of the touch screen controller. The inherent capacitance is a capacitance between the force line and the sense line that is independent of the touch screen controller.

This method may include pairing each of the plurality of touch screen controllers with a corresponding touch screen display, and causing each touch screen controller to enter the touch screen display characterization mode to characterize its corresponding touch screen display.

The touch signal may represent a capacitance between the force line and the sense line, and processing of the touch signal may include compensating the capacitance by coupling a compensation circuit to the force line a given number of time, converting the capacitance to a current, using a capacitance to current converter, accumulating the charge a given number of times to produce an accumulated signal, using an accumulator circuit, and amplifying the accumulated signal to produce the touch data signal, using a gain stage.

The at least one operational parameter may be at least one of a number of accumulations performed by the accumulator circuit, and a number of times the compensation circuit is coupled to the force line.

The at least one subcomponent characteristic may be at least one of a capacitance of a feedback capacitor in the accumulator circuit, a common mode voltage present on the force line and the sense line, and capacitance values of capacitors in the compensation circuit.

The inherent capacitance may be determined as a function of a sum of first and second expressions, with the first expression including a product of the touch data signal and the capacitance of the feedback capacitor, divided by at least the number of accumulations performed by the accumulator circuit. The second expression may include a product of the common mode voltage, the number of times the compensation circuit is coupled to the force line, and a sum of the capacitance values of capacitors in the compensation circuit.

DETAILED DESCRIPTION

In the following detailed description and the attached drawings and appendices, numerous specific details are set forth to provide a thorough understanding of the present disclosure. However, those skilled in the art will appreciate that the present disclosure may be practiced, in some instances, without such specific details. In other instances, well-known elements have been illustrated in schematic or block diagram form in order not to obscure the present disclosure in unnecessary detail. Additionally, for the most part, specific details, and the like, have been omitted in as much as such details are not considered necessary to obtain a complete understanding of the present disclosure, and are considered to be within the understanding of persons of ordinary skill in the relevant art.

The same elements have been designated with the same reference numerals in the different drawings. In particular, the structural and/or functional elements common to the different embodiments may be designated with the same reference numerals and may have similar or identical structural, dimensional, and material properties.

Disclosed herein is a method for enabling testing of capacity of a touch screen display during manufacture and after pairing with a touch screen controller (or after manufacture for later failure analysis), without the use of external test equipment, in a fashion that provides for determination of the capacity of the touch screen display. First, to facilitate discussion and understanding, a sample touch screen display and sample touch screen controller will be described. Then, the method discussed above will be described with reference to the sample touch screen display and sample touch screen controller. Finally, a specific example of implementation in a touch screen controller will be described, with the understanding that the method discussed above is applicable to any touch screen controller and any touch screen display, and that this specific example is just one example, with all possible implementations not shown being intended to be within the scope of this disclosure.

Figure 1A:
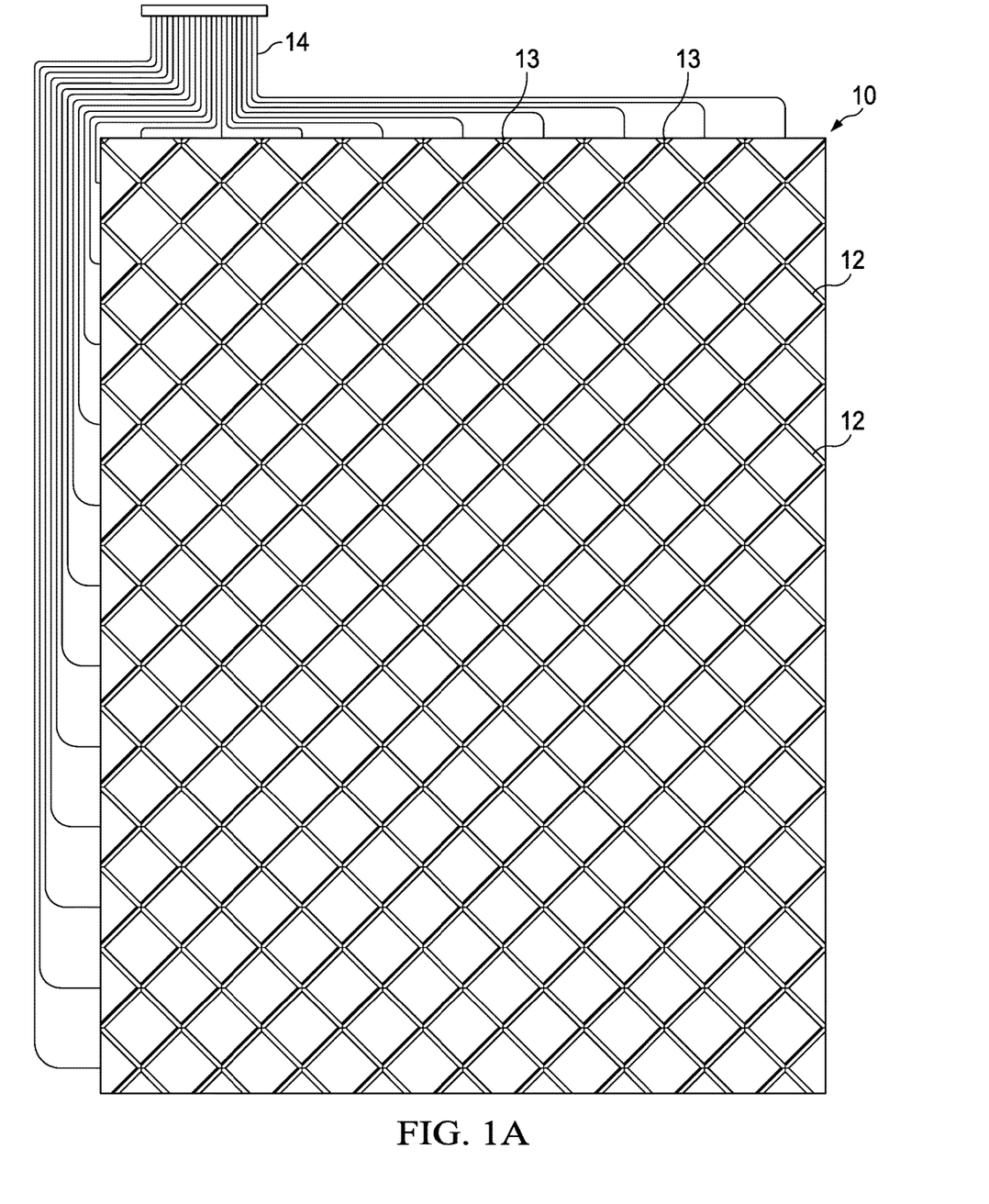
FIG. 1A is a schematic representation of a capacitive touch matrix.

Turning first to description of a sample touch screen display and sample touch screen controller, refer to FIG. 1A. Shown in FIG. 1A is a touch screen display having a capacitive touch matrix 10 comprised of rows 12 and columns 13 arranged in a diamond pattern. The capacitive touch matrix 10 may be transparent to allow light from an underlying display unit to pass through the capacitive touch matrix 10 for viewing by a user. A plurality of conductors 14 may be provided for making contact to rows 12 and columns 13. Rows 12 and columns 13 may cover substantially the entire face of the touch screen display, enabling touch and proximity detection at substantially any location on the touch screen display.

Figure 1B:
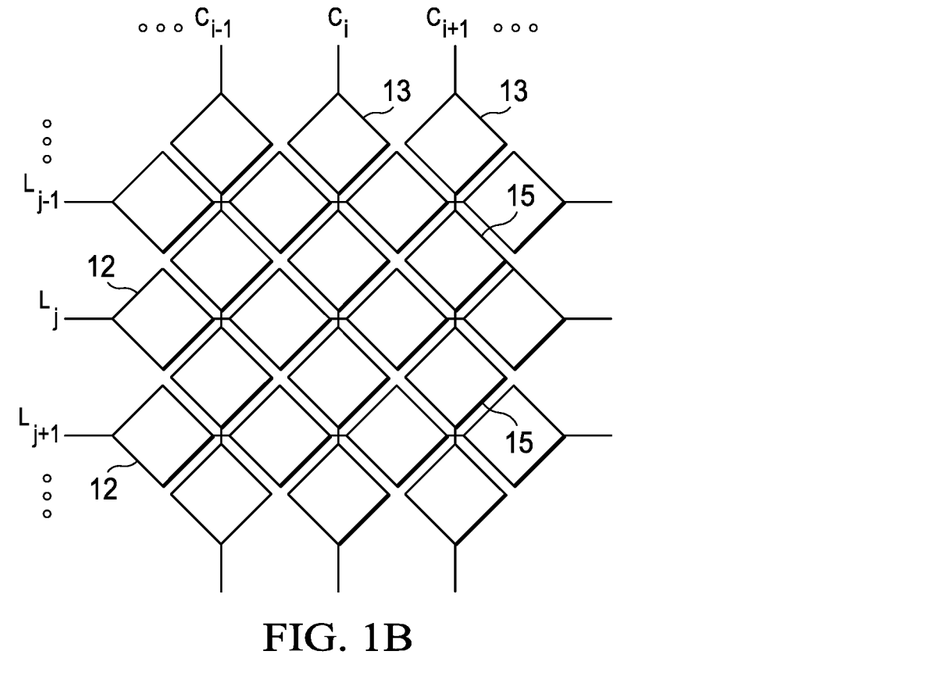
FIG. 1B is an enlarged schematic diagram of a portion of the capacitive touch matrix, showing rows and columns having diamond configurations.

Shown in FIG. 1B is an enlarged portion of the capacitive touch matrix 10 in further detail. The capacitive touch matrix 10 includes a plurality of columns 13 (Ci) and a plurality of rows 12 (Lj). The columns 13 extend vertically and the rows 12 extend horizontally in FIG. 1B. The rows 12 and the columns 13 cross above or below each other at their intersection points, but are not in contact with one another. Each of the rows 12 and the columns 13 has conductors arranged in a diamond pattern. As a result, the rows 12 and the columns 13 are separated from each other by capacitive gaps 15. The diamond pattern may provide increased capacitance between rows 12 and columns 13, as compared with straight conductors. Capacitive touch matrix 10 may sense an object that modifies the fringing electric field above the capacitive gaps 15 when the object is in contact with or in proximity to the screen.

Figure 1C:
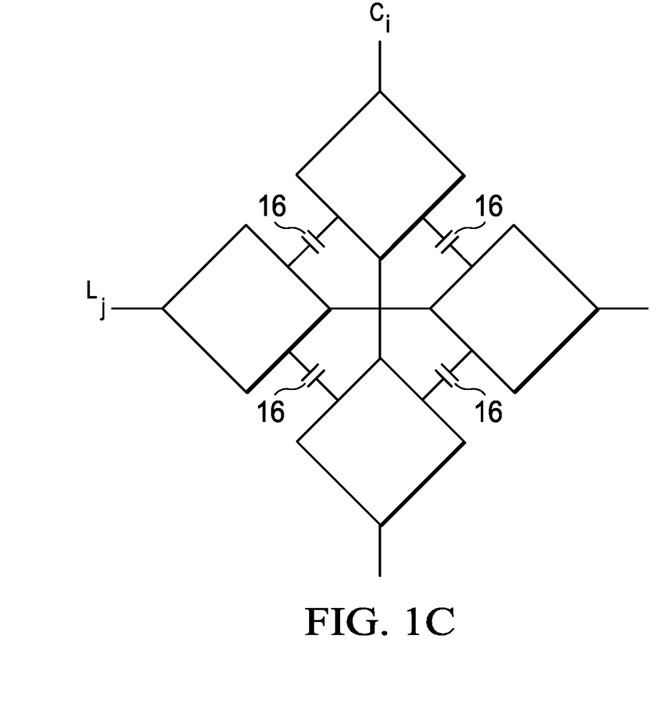
FIG. 1C is a schematic diagram of a single intersection of a row and column, illustrating capacitances between rows and columns.

FIG. 1C shows that when a column Ci and a row Lj are selected, the total capacitance between column Ci and row Lj is the sum of four capacitances 16 between the four adjacent diamond-shaped regions of column Ci and row Lj. The capacitance between column Ci and row Lj can be sensed to determine whether an object is in contact with or in proximity to the touch screen display above the region in which the four capacitances 16 are formed. Each row 12 and column 13 of the capacitive touch matrix 10 may be selected in succession to sense the capacitances at each position of the touch screen display.

Figure 2:
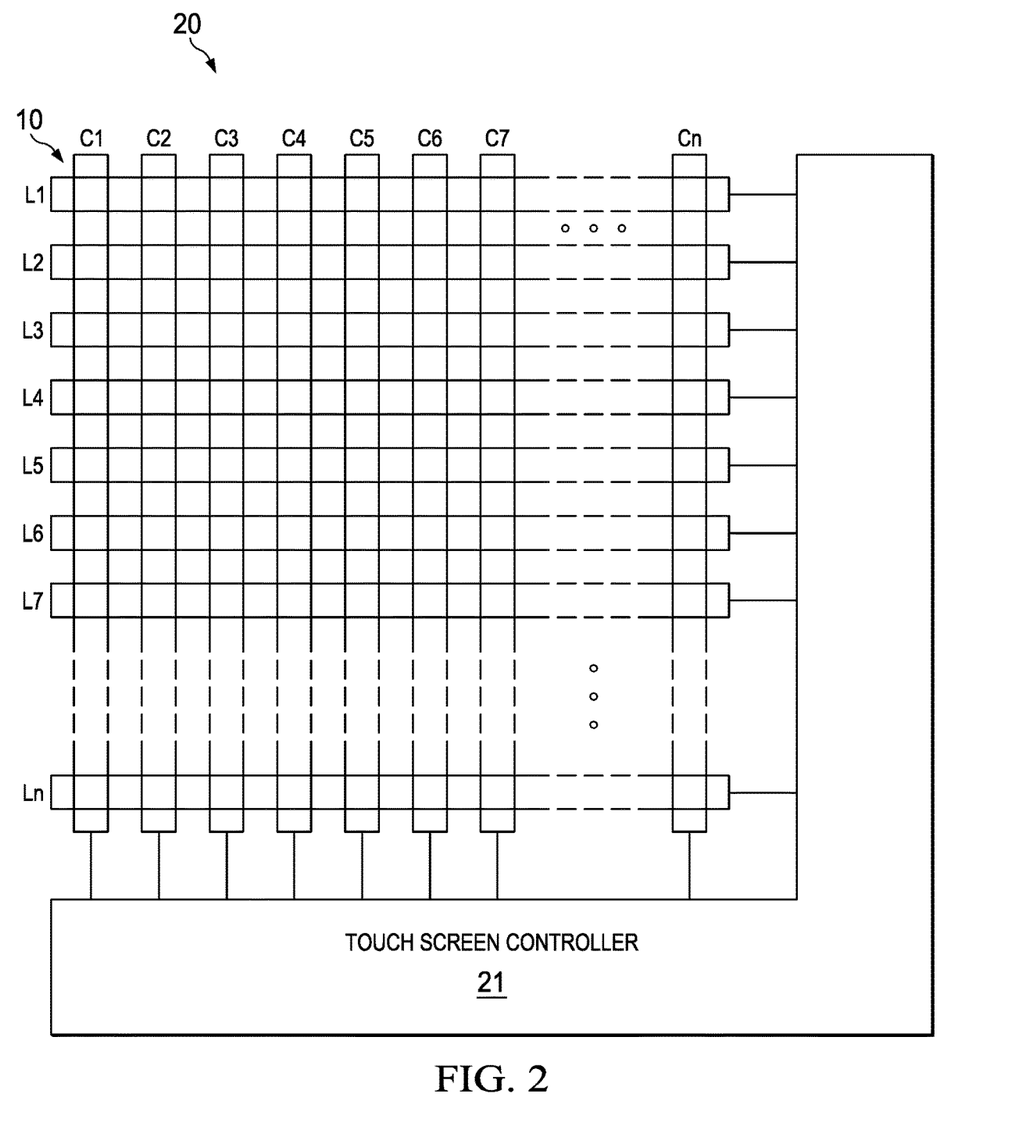
FIG. 2 is a block diagram of a touch screen controller which can perform the techniques and methods described herein.

Depicted in FIG. 2 is a block diagram of a touch screen display 20 that includes the capacitive touch matrix 10 and an associated touch screen controller 21. As discussed above, the capacitive touch matrix 10 may have a diamond pattern, which is not shown in FIG. 2 for clarity.

In general, in mutual capacitance sensing, a forcing signal is applied to a column (or to a row) by the touch screen controller 21, and a coupled signal is sensed on one or more rows (or columns).

Figure 3:
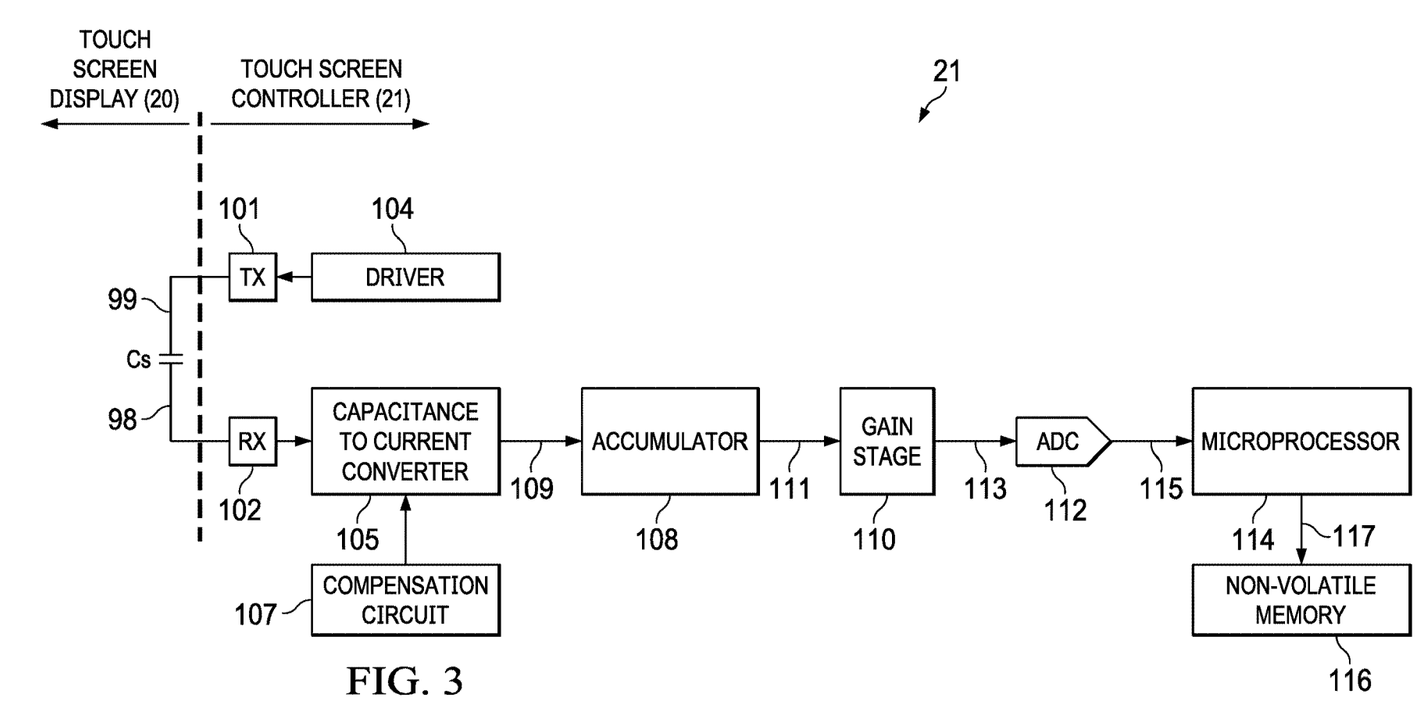
FIG. 3 is a more detailed block diagram of the touch screen controller of FIG. 2.

Further details of the touch screen controller 21 are shown in FIG. 3. As depicted, the touch screen controller 21 includes, for each column conductor (or row conductor) of the capacitive touch matrix 10 that is to act as a force line and receive the forcing signal, a transmit channel 101. Likewise, the touch screen controller 21 includes, for each row conductor (or column conductor) of the capacitive touch matrix 10 that is to act as a sense line and receive the coupled signal, a receive channel 102. An inherent capacitance Cs of the capacitive touch matrix 10, between the column conductor (or row conductor) and row conductor (or column conductor), is present between the transmit channel 101 and receive channel 102. A switch S1 is for selectively coupling the transmit channel 101 to a Vpump signal, in response a CHRG signal, to thereby charge the inherent capacitance Cs.

An amplifier 104 is coupled to the transmit channel 101, and serves to drive the column conductor (or row conductor) coupled to the transmit channel 101 with the forcing signal.

A charge to current converter 105 is coupled to the receive channel 102, and serves to convert the charge present at the receive channel 102 to a current signal 109. It is noted that a compensation circuit 107 includes at least one compensation capacitor that can be selectively coupled to the receive channel 102. An accumulator 108 serves to accumulate the current signal 109 as received from the charge to current converter 105 a given number of times, and then passes the accumulated current signal 111 to a gain stage 110 for amplification. After amplification, an analog to digital converter 112 converts the amplified signal 113 to produce a touch data signal 115. A microprocessor 114 receives the touch data signal 115 and performs desired functions (such as determining coordinates of a touch). The microprocessor 114 can store data to and retrieve values from non-volatile memory 116.

Since, as described, mutual capacitance sensing relies upon the capacitances between row/column pairs, it is useful to know the inherent capacitance Cs between each row/column pair. This capacitance can indicate the quality and consistency of manufacturing of the capacitive touch matrix 10, as well as well as the quality and consistency of connections between the capacitive touch matrix 10 and the touch screen controller 21. This capacitance can also be used in failure analysis to determine whether an error was caused by the capacitive touch matrix 10, the touch screen controller 21, or connections there between.

To that end, as will be described, the Inventors have found that it is possible to program the touch screen controller 21 to determine each of the inherent capacitances Cs. This will now be described with reference to the flowcharts 150 of FIG. 4A and 166 of FIG. 4B, in addition to the prior above description.

Figure 4A:
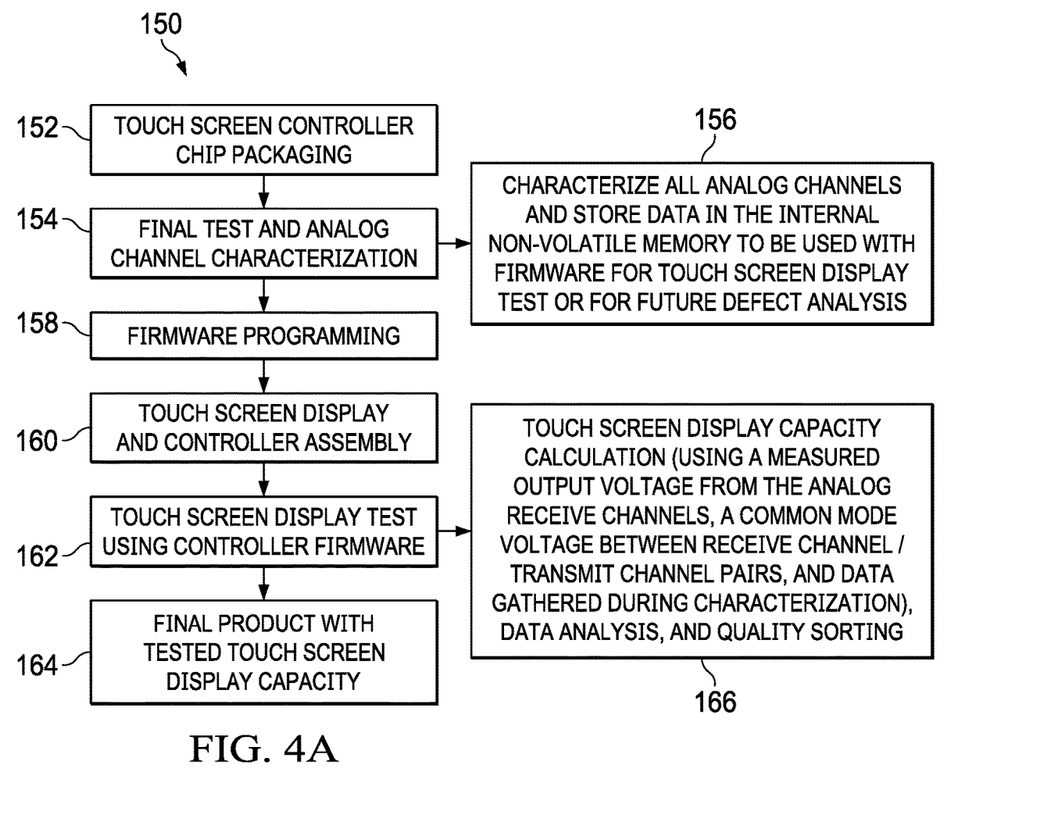
FIG. 4A is a flowchart of a method of manufacturing a touch screen display, in accordance with this disclosure.

Initially, referring to FIG. 4A, a touch screen controller 21 is formed and packaged (Block 152). It is then tested for proper function, and its analog transmit channels 101 and analog receive channels 102 are characterized (Block 154). In greater detail, all analog transmit channels 101 and analog receive channels 102 are characterized to determine their subcomponent characteristics and operational parameters, which are then stored in the non-volatile memory (Block 156). The subcomponent characteristics are different for different touch screen controller 21 designs, and may include the capacitance of the capacitors in the compensation circuit 107 and in the accumulator 108 that are of interest. Likewise, the operating parameters are different for different touch screen controller 21 designs, and may include a number of accumulations performed by the accumulator 108, the voltage of the amplified signal 113, a current conveyor division factor, a charge pump voltage, and a number of times the compensation circuit 107 is coupled to the transmit channel 101 during a sensing cycle.

The characterization of the subcomponent characteristics can be performed using external automated test equipment (ATE). The characterization of the operational parameters can likewise be performed using external automated test equipment (ATE).

Thereafter, the microprocessor 114 is programmed with firmware (Block 158). The firmware enables the microprocessor 114 to perform the functions described below. The touch screen display 20 and touch screen controller 21 are then assembled together into a unit (Block 160). Then, the touch screen display 20 is tested using the firmware in the touch screen controller 21 (Block 162), which will be described in further detail below. Testing produces the final product, which has a fully determined capacitance distribution map.

Figure 4B:
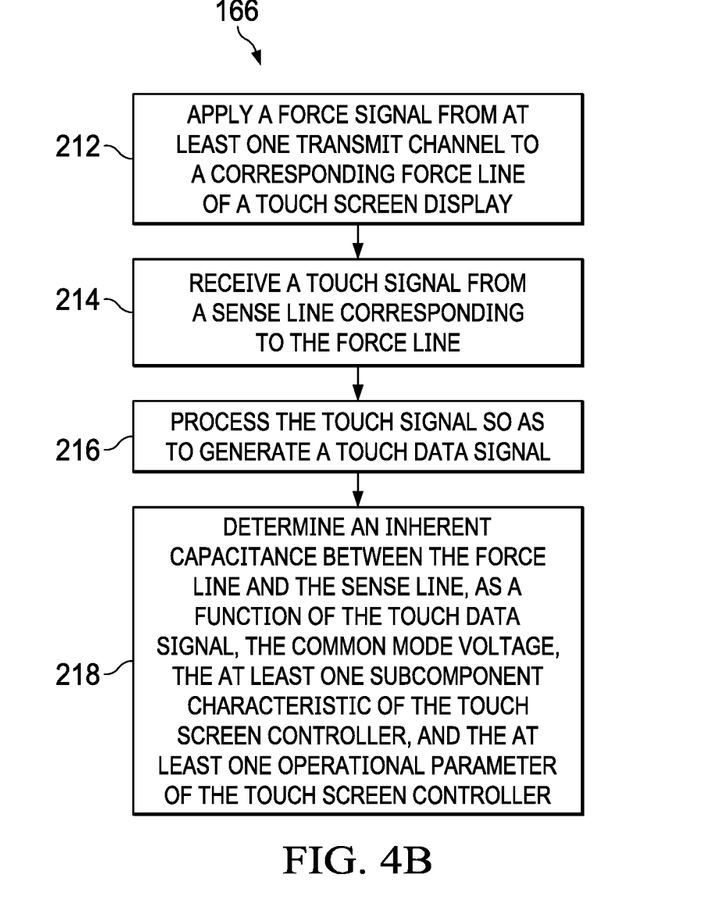
FIG. 4B is a flowchart containing further details of the touch screen controller capacity determination and the touch screen display testing procedure of FIG. 4A.

The testing of the touch screen display 20 is now described in further detail with reference to FIG. 4B. Here, the touch screen controller 21 performs a capacitive touch matrix capacity determination function. This includes the application of a force signal from the transmit channel 101 of the touch screen controller 21 to a corresponding force line 99 of the touch screen display 20 (Block 212), and the reception of a touch signal from a sense line 98 of the touch screen display 20 corresponding to the force line 99 (Block 214). The touch signal, upon receipt by the microprocessor 114, is processed so as to generate a touch data signal (Block 216), and finally the inherent capacitance Cs between the force line 99 and each sense line 98 is determined based upon the touch signal, a common mode voltage between the sense line 98 and force line 99, the stored subcomponent characteristics, and the stored operational parameters (Block 218). Data analysis and quality sorting may also be applied.

Figure 5A:
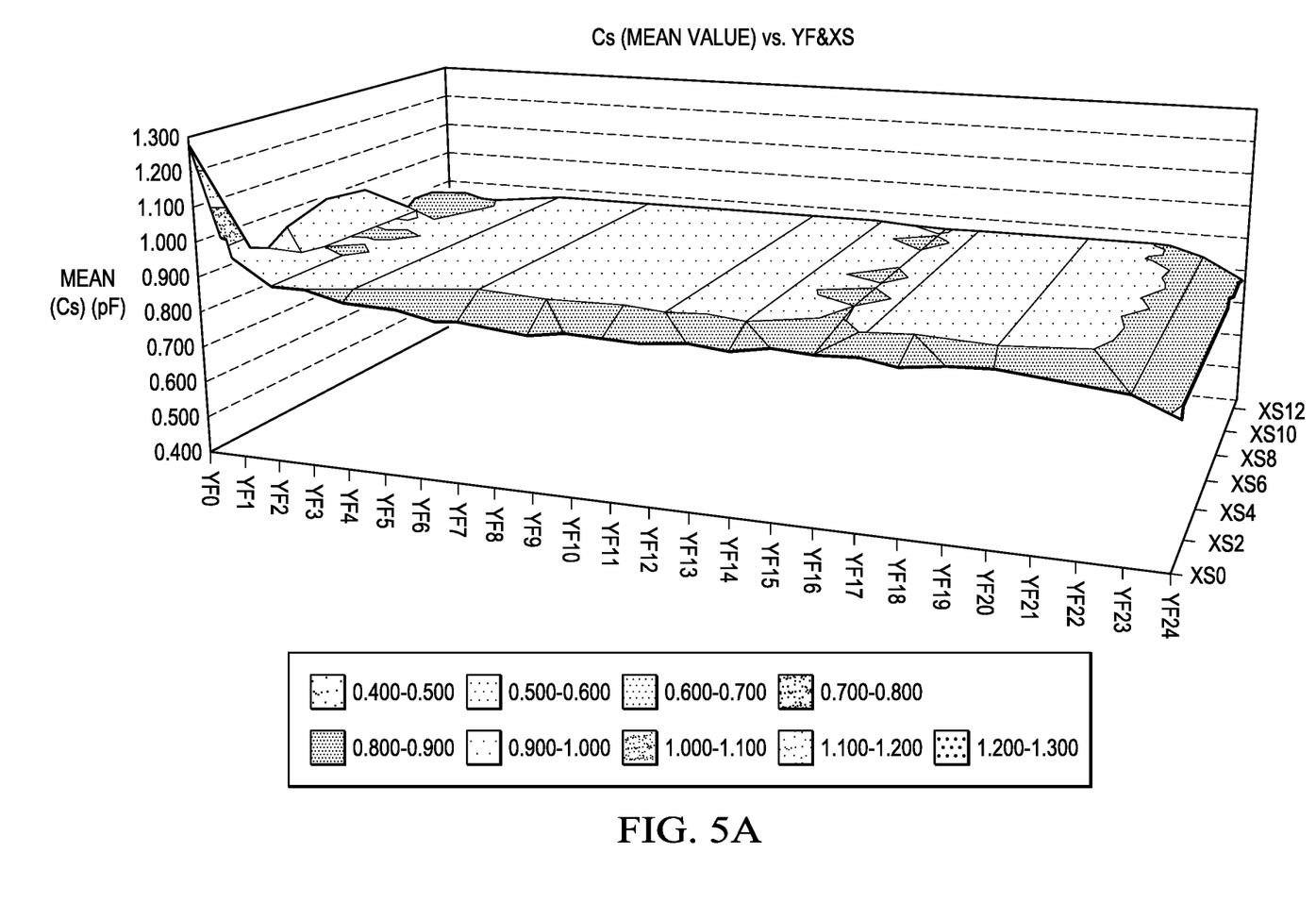
FIGS. 5A and 5B are graphs showing an example of the effectiveness of the methods and techniques described herein.
Figure 5B:
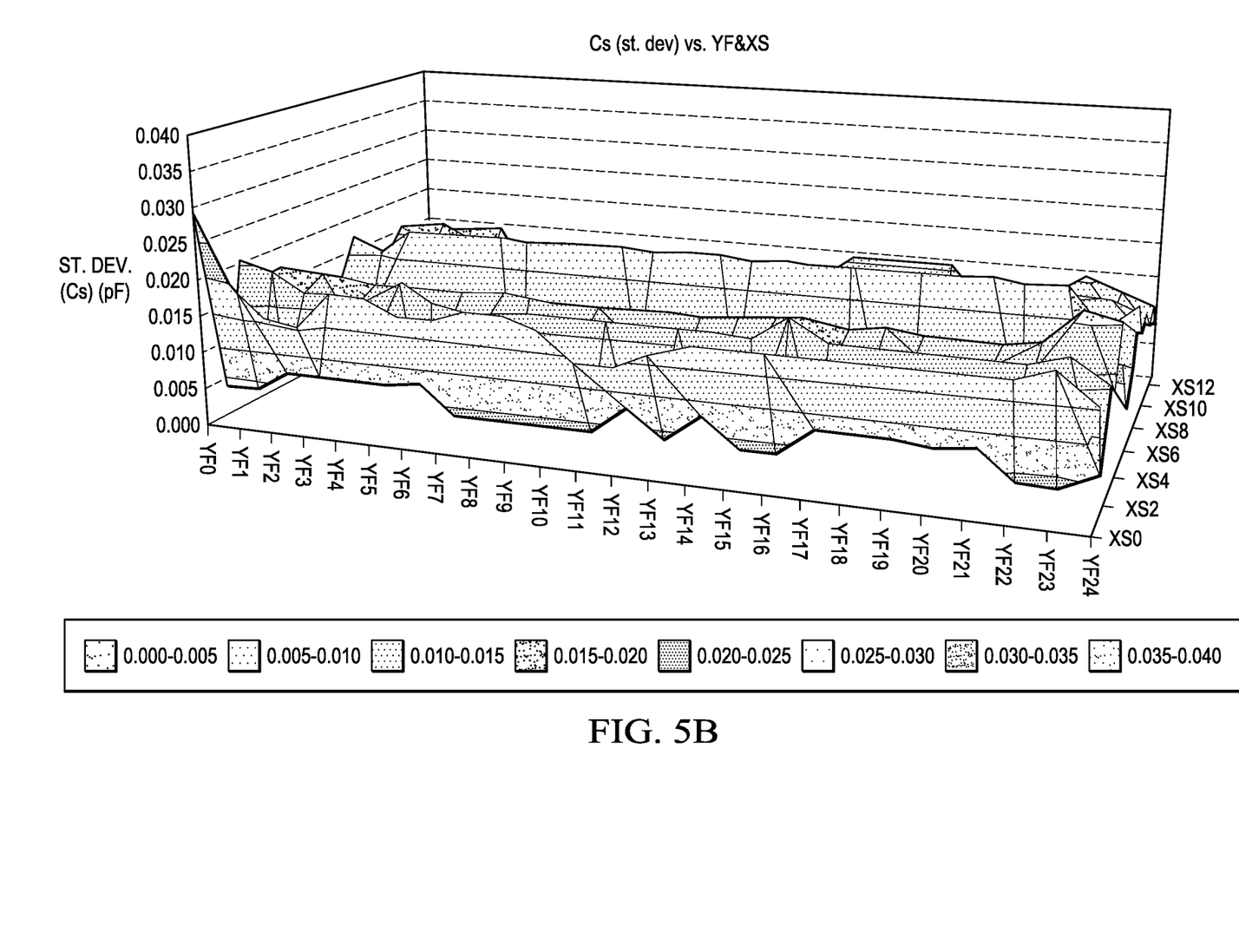

The effectiveness of the above described techniques in determining the capacitance Cs can be seen in the graphs of FIG. 5A and FIG. 5B (an example), respectively showing the mean value and a respective standard deviation of five measurements of Cs of a single touch screen display performed by five different ATE calibrated TSC devices. As can be observed, the standard deviation is low.

A sample implementation of the touch screen controller 21, and specific details of how the calculation of Cs is performed on that sample implementation, is now described with reference to FIG. 6, and reference back to FIG. 2.

Figure 6:
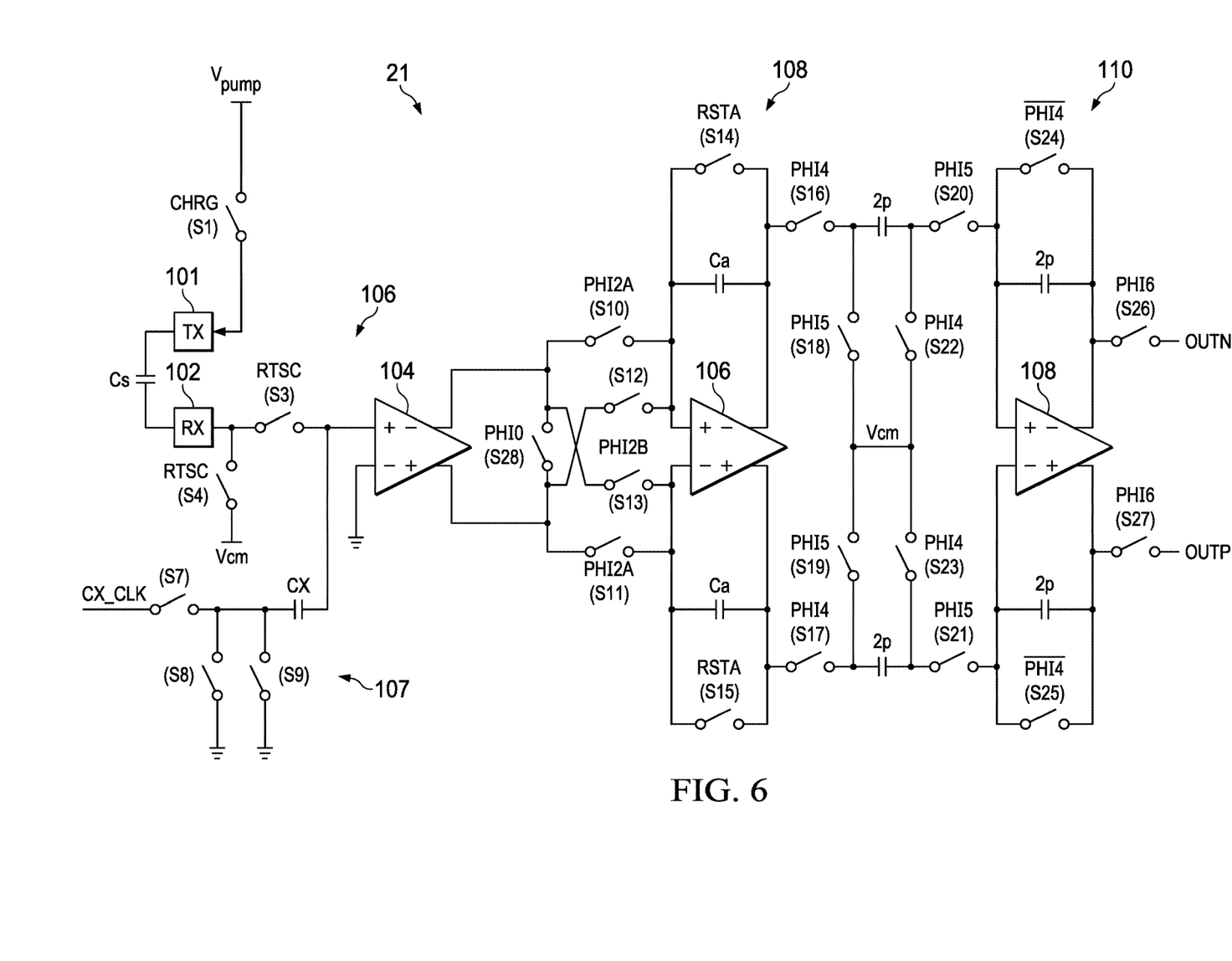
FIG. 6 is a schematic diagram of a sample detailed implementation of the touch screen controller of FIG. 2.

As shown in FIG. 6, the charge to current converter 105 includes an amplifier 104. A switch S28 is coupled between the inverting output and non-inverting output of the amplifier 104, and is controlled by signal PHI0. The amplifier 104 has its inverting terminal grounded, and its non-inverting terminal coupled to switch S3. Switch S3 selectively couples the receive channel 102 to the non-inverting terminal of the amplifier 104 under control of the RTSC signal. The receive channel 102 is selectively coupled to a common mode voltage Vcm via switch S4, which is also controlled via the RTSC signal.

The compensation circuit 107 includes capacitor Cx that is selectively coupled between a compensation clock signal CX_CLK and the non-inverting terminal of the amplifier 104 via switch S7. The capacitor Cx is selectively shorted to ground for discharging purposes via switches S8 and S9.

The amplifier 104 has its inverting output selectively coupled to the inverting terminal of amplifier 106 of the accumulator 108 via switch S13, which is controlled via assertion of signal PHI2B. The amplifier 104 has its non-inverting output selectively coupled to the non-inverting terminal of the amplifier 106 of the accumulator 108 via switch S12, which is also controlled via assertion of signal PHI2B. The amplifier also has its inverting output selectively coupled to the non-inverting terminal of the amplifier 106 via switch S10, which is controlled via signal PHI2A, and its non-inverting output selectively coupled to the inverting terminal of the amplifier 106 via switch S11, which is also controlled via signal PHI2A.

A first capacitor Ca1 is coupled between the non-inverting input of the amplifier 106 and the inverting output of the amplifier 106, and a second capacitor Ca2 is coupled between the inverting input of the amplifier 106 and the non-inverting output of the amplifier 106. A switch S14 selectively shorts the first capacitor Ca1, and a switch S15 selectively shorts the second capacitor Ca2. The switches S14 and S15 are controlled by the signal RSTA.

The gain stage 110 includes a switch S16 coupling the inverting output of the amplifier 106 to the first capacitor 2p, and a switch S17 coupling the non-inverting output of the amplifier 106 to the second capacitor 2p. Switches S16 and S17 are controlled by signal PHI4. Switch S18 is coupled between the first capacitor 2p and the common mode voltage Vcm, and switch S19 is coupled between the second capacitor 2p and the common mode voltage Vcm. Switches S18 and S19 are controlled by signal PHI5. Switch S22 is coupled between the first capacitor 2p and the common mode voltage Vcm, and switch S22 is coupled between the second capacitor 2p and the common mode voltage Vcm. Switches S22 and S23 are controlled by signal PHI4.

Switch S20 selectively couples the non-inverting input of amplifier 106 to the first capacitor 2p, while switch S21 selectively couples the inverting input of the amplifier 106 to the second capacitor 2p. Switches S20 and S21 are controlled by signal PHI5.

A third capacitor 2p is coupled between the non-inverting input and inverting output of the amplifier 108, and switch S24 selectively shorts the third capacitor 2p under control of the inverse of the control signal PHI4. A fourth capacitor 2p is coupled between the inverting input and the non-inverting output of the amplifier 108, and the switch S25 selectively shorts the fourth capacitor 2p under control of the inverse of the control signal PHI4. The inverting output of the amplifier 108 is coupled to the output OUTN by switch S26, and the non-inverting output of the amplifier 108 is coupled to the output OUTP by switch S27. Switches S26 and S27 are controlled by the signal PHI6.

It is noted that, in reality, the amplifier 104 is a single ended input differential output current conveyor. However, the amplifier 104 is depicted as an amplifier to illustrate that the current conveyor input is being kept at the Vcm level, and acts as a single ended current hole with the differential (inverted and non-inverted, not inverting and non-inverting) current output. The switch 28 is closed during the PHI0 phase so that the output current effectively "circulates" between the outputs. In such an approach when the switch 28 opens, the current starts flowing further in the chain, and thus this design improves the current conveyor response. The switches S10, S11, S12 and S13 act as a chopper for the accumulator 108 where the particular charge injections are being accumulated. These charge injections are provided by the Vpump voltage which is being periodically switched into the TX pad, and the charge transfers through the Cs capacitor, into the RX pad, and into the rest of the analog front-end channel. Therefore, the circuitry of the touch screen controller 24 depicted in FIG. 6 acts as a switched type synchronous detector with an accumulator/memory stage. The amplifier 106 acts simultaneously as a current to voltage converter, so at the accumulator 108 output, the signal is being managed in the voltage domain. The rest of the circuitry of the touch screen controller 21 depicted in FIG. 6 acts as a switched capacitor amplifier, and a sample and hold circuit simultaneously.

Provided that the characterization of the subcomponent characteristics and the operational parameters has been performed and that the data from such is accessible to the touch screen controller 21, the following equation can be solved for each capacitance Cs.

$$C_s = \frac{V_{out} M C_a}{N_{acc} V_{pump}} + \frac{2(V_{cm} cxcnt (C_{x1} + C_{x2}))}{V_{pump}},$$

where Vout is the voltage of the signal 113, Nacc is the number of accumulations, M is the current conveyor division factor, Ca is the integrator feedback capacitor capacitance value, Vpump is the capacity measurement bias voltage (charge pump voltage), Vcm is the common mode voltage, cxcnt is number of compensations using the compensation capacitor Cx, and Cx is the capacitance value of the compensation capacitor.

It should be appreciated that equations similar to that above can be derived for any touch screen controller, and thus, the teachings herein are applicable to any touch screen controller design. Therefore, the teachings above are not specific or limited in any way to the specific design of the touch screen controller 21. Indeed, the teachings above show that by preparing the touch screen controller for the test scheme, the various subcomponents characteristics of the touch screen controller, for each device channel, can be determined and stored in nonvolatile memory. Therefore, any touch screen controller can be prepared to be used as a measurement device able to characterize the inherent capacitance Cs distribution across an entire touch screen display.

As stated above, the determined capacitance Cs can indicate the quality and consistency of manufacturing of the capacitive touch matrix and touch screen display, as well as well as the quality and consistency of connections between the touch screen display and the touch screen controller. This allows, without the use of an automated test equipment (ATE) machine, for reduction or elimination of issues related to the testing of touch screen displays during manufacturing through the enabling of locating and localizing of such issues. In addition, this allows for failure analysis, where the calibration values obtained in the touch screen controller at the time of production can be compared to values obtained of the time of the failure analysis.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A method, comprising:
providing a touch screen controller having transmit and receive channels;
determining at least one subcomponent characteristic and at least one operational parameter of at least one transmit channel from among the transmit channels of the touch screen controller;
coupling a touch screen display having force lines and sense lines to the transmit and receive channels of the touch screen controller;
applying a force signal from the at least one transmit channel to a corresponding force line of the touch screen display, using the touch screen controller;
receiving a touch signal from a sense line of the touch screen display corresponding to the force line, at the touch screen controller, while the sense line and the force line are coupled to the transmit and receive channels of the touch screen controller;
processing the touch signal so as to generate a touch data signal, using the touch screen controller; and
determining an inherent capacitance between the force line and the sense line as a function of the touch data signal, a common mode voltage present between the force line and the sense line while the sense line and the force line are coupled to the transmit and receive channels of the touch screen controller, the at least one subcomponent characteristic, and the at least one operational parameter, using the touch screen controller;
wherein the inherent capacitance is a capacitance between the force line and the sense line that is independent of the touch screen controller.

2. The method of claim 1, wherein the touch signal represents a capacitance between the force line and the sense line; and wherein processing of the touch signal using the touch screen controller comprises:
compensating the capacitance by coupling a compensation circuit to the force line a given number of times;
converting the capacitance to a charge, using a capacitance to voltage converter;
accumulating the charge a given number of times to produce an accumulated signal, using an accumulator circuit; and
amplifying the accumulated signal to produce the touch data signal, using a gain stage.

3. The method of claim 2, wherein the at least one operational parameter comprises at least one of a number of accumulations performed by the accumulator circuit and a number of times the compensation circuit is coupled to the force line.

4. The method of claim 3, wherein the at least one subcomponent characteristic comprises at least one of a capacitance of a feedback capacitor in the accumulator circuit and capacitance values of capacitors in the compensation circuit.

5. The method of claim 4, wherein the inherent capacitance is determined as a function of a sum of first and second expressions; wherein the first expression includes a product of the touch data signal and the capacitance of the feedback capacitor, divided by at least the number of accumulations performed by the accumulator circuit; wherein the second expression includes a product of the common mode voltage, the number of times the compensation circuit is coupled to the force line, and a sum of the capacitance values of capacitors in the compensation circuit.

6. The method of claim 1, further comprising storing the at least one subcomponent characteristic and the at least one operational parameter in a non-volatile memory of the touch screen controller.

7. The method of claim 1, wherein providing the touch screen display comprises manufacturing the touch screen display.

8. A system, comprising:
a touch screen display having force lines and sense lines;
a touch screen controller having transmit and receive channels respectively force and sense lines of the touch screen display, wherein the touch screen controller is configured to:
apply a force signal from at least one transmit channel to a corresponding force line of the touch screen display;
receive a touch signal from a sense line corresponding to the force line;
process the touch signal so as to generate a touch data signal; and
determine an inherent capacitance between the force line and the sense line as a function of the touch data signal, a common mode voltage present between the force line and the sense line during operation, at least one subcomponent characteristic of the touch screen controller, and at least one operational parameter of the touch screen controller;
wherein the inherent capacitance is a capacitance between the force line and the sense line that is independent of the touch screen controller.

9. The system of claim 8, wherein the touch screen controller includes a non-volatile memory storing the at least one subcomponent characteristic and the at least one operational parameter.

10. The system of claim 8, wherein the touch signal represents a capacitance between the force line and the sense line; and wherein the touch screen controller includes:
a compensation circuit having a capacitor configured to be selectively coupled to the force line a given number of times;
a capacitance to current converter configured to convert the capacitance to a current;
an accumulator circuit including a feedback capacitor and configured to accumulate the current a given number of times to produce an accumulated signal; and
a gain stage configured to amplify the accumulated signal to produce the touch data signal.

11. The system of claim 10, wherein the at least one operational parameter comprises at least one of a number of accumulations performed by the accumulator circuit, and a number of times the compensation circuit is coupled to the force line.

12. The system of claim 11, wherein the at least one subcomponent characteristic comprises at least one of a capacitance of the feedback capacitor in the accumulator circuit and a capacitance value of the capacitor in the compensation circuit.

13. The system of claim 12, wherein the touch screen controller determines the inherent capacitance as a function of a sum of first and second expressions; wherein the first expression includes a product of the touch data signal and the capacitance of the feedback capacitor, divided by at least the number of accumulations performed by the accumulator circuit; wherein the second expression includes a product of the common mode voltage, the number of times the compensation circuit is coupled to the force line, and a sum of the capacitance values of capacitors in the compensation circuit.

14. A method, comprising:
manufacture a plurality of touch screen controllers having transmit channels and receive channels;
for each of the plurality of touch screen controllers:
characterize that touch screen controller so as to determine at least one subcomponent characteristic and at least one operational parameter of at least one transmit channel of that touch screen controller;
store the at least one subcomponent characteristic and the at least one operational parameter in a non-volatile memory of that touch screen controller; and
program that touch screen controller to, in a touch screen display characterization mode:
apply a force signal from at least one transmit channel to a corresponding force line of a touch screen display,
receive a touch signal from a sense line corresponding to the force line,
process the touch signal so as to generate a touch data signal, and
determine an inherent capacitance between the force line and a corresponding touch line of the touch screen display as a function of the touch data signal, the at least one subcomponent characteristic of the touch screen controller, and the at least one operational parameter of the touch screen controller,
wherein the inherent capacitance is a capacitance between the force line and the sense line that is independent of the touch screen controller.

15. The method of claim 14, further comprising pairing each of the plurality of touch screen controllers with a corresponding touch screen display, and causing each touch screen controller to enter the touch screen display characterization mode to characterize its corresponding touch screen display.

16. The method of claim 14, wherein the touch signal represents a capacitance between the force line and the sense line; and wherein processing of the touch signal comprises:
compensating the capacitance by coupling a compensation circuit to the force line a given number of times;
converting the capacitance to a current, using a capacitance to current converter;
accumulating the current a given number of times to produce an accumulated signal, using an accumulator circuit; and
amplifying the accumulated signal to produce the touch data signal, using a gain stage.

17. The method of claim 16, wherein the at least one operational parameter comprises at least one of a number of accumulations performed by the accumulator circuit, and a number of times the compensation circuit is coupled to the force line.

18. The method of claim 17, wherein the at least one subcomponent characteristic comprises at least one of a capacitance of a feedback capacitor in the accumulator circuit, a common mode voltage present on the force line and the sense line, and capacitance values of capacitors in the compensation circuit.

19. The method of claim 18, wherein the inherent capacitance is determined as a function of a sum of first and second expressions; wherein the first expression includes a product of the touch data signal and the capacitance of the feedback capacitor, divided by at least the number of accumulations performed by the accumulator circuit; wherein the second expression includes a product of the common mode voltage, the number of times the compensation circuit is coupled to the force line, and a sum of the capacitance values of capacitors in the compensation circuit.

20. A method, comprising:
providing a touch screen controller having transmit and receive channels;
determining at least one subcomponent characteristic and at least one operational parameter of at least one transmit channel from among the transmit channels of the touch screen controller;
coupling a touch screen display having force lines and sense lines to the transmit and receive channels of the touch screen controller;
applying a force signal from the at least one transmit channel to a corresponding force line of the touch screen display, using the touch screen controller;
receiving a touch signal from a sense line of the touch screen display corresponding to the force line, at the touch screen controller, wherein the touch signal represents a capacitance between the force line and the sense line;
processing the touch signal so as to generate a touch data signal, using the touch screen controller, by:
compensating the capacitance by coupling a compensation circuit to the force line;
converting the capacitance to a charge, using a capacitance to voltage converter;
accumulating the charge to produce an accumulated signal, using an accumulator circuit; and
amplifying the accumulated signal to produce the touch data signal, using a gain stage; and
determining an inherent capacitance between the force line and the sense line as a function of the touch data signal, a common mode voltage present between the force line and the sense line, the at least one subcomponent characteristic, and the at least one operational parameter, using the touch screen controller.

21. The method of claim 20, wherein the at least one operational parameter comprises at least one of a number of accumulations performed by the accumulator circuit and a number of times the compensation circuit is coupled to the force line.

22. The method of claim 21, wherein the at least one subcomponent characteristic comprises at least one of a capacitance of a feedback capacitor in the accumulator circuit and capacitance values of capacitors in the compensation circuit.

23. The method of claim 22, wherein the inherent capacitance is determined as a function of a sum of first and second expressions; wherein the first expression includes a product of the touch data signal and the capacitance of the feedback capacitor, divided by at least the number of accumulations performed by the accumulator circuit; wherein the second expression includes a product of the common mode voltage, the number of times the compensation circuit is coupled to the force line, and a sum of the capacitance values of capacitors in the compensation circuit.

* * * * *